(12) United States Patent
Kitamura et al.

(10) Patent No.: US 7,131,886 B2
(45) Date of Patent: Nov. 7, 2006

(54) METHOD OF PRODUCING FIBER, AND METHODS OF PRODUCING ELECTRON-EMITTING DEVICE, ELECTRON SOURCE, AND IMAGE DISPLAY DEVICE EACH USING THE FIBER

(75) Inventors: Shin Kitamura, Kanagawa (JP); Takeo Tsukamoto, Kanagawa (JP); Junri Ishikura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 10/879,048

(22) Filed: Jun. 30, 2004

(65) Prior Publication Data

US 2004/0245904 A1 Dec. 9, 2004

Related U.S. Application Data

(62) Division of application No. 10/234,368, filed on Sep. 5, 2002, now Pat. No. 6,843,696.

(30) Foreign Application Priority Data

Sep. 10, 2001 (JP) .............................. 2001-273945
Jun. 28, 2002 (JP) .............................. 2002-189580

(51) Int. Cl.
*H01J 9/04* (2006.01)
*H01J 9/12* (2006.01)

(52) U.S. Cl. ........................... 445/51; 445/50; 997/842

(58) Field of Classification Search ........ 313/309–311; 423/447.1–447.9; 445/49–51; 977/842–848
See application file for complete search history.

(56) References Cited

U.S. PATENT DOCUMENTS 4,728,851 A 3/1988 Lambe ........................ 313/309
4,904,895 A 2/1990 Tsukamoto et al. ......... 313/336
5,039,504 A 8/1991 Kageyama et al. ......... 423/448
5,872,422 A 2/1999 Xu et al. ..................... 313/311
5,973,444 A 10/1999 Xu et al. ..................... 313/309
5,982,091 A 11/1999 Konishi ...................... 313/495
5,986,389 A 11/1999 Tsukamoto ................. 313/310
6,087,765 A 7/2000 Coll et al. ................... 313/309
6,147,449 A 11/2000 Iwasaki et al. .............. 313/495
6,171,162 B1 1/2001 Iwasaki et al. ................. 445/6
6,184,610 B1 2/2001 Shibata et al. .............. 313/309

(Continued)

FOREIGN PATENT DOCUMENTS

EP 0 290 026 A1 11/1988

(Continued)

OTHER PUBLICATIONS

C.A. Spindt et al., Physical Properties of Thin-Film Field Emission Cathodes with Molybdenum Cones, Journal of Applied Physics., vol. 47, No. 12, pp. 5248-5263 (1976).

(Continued)

*Primary Examiner*—Joseph Williams
*Assistant Examiner*—Bumsuk Won
(74) *Attorney, Agent, or Firm*—Fitzpatrick, Cella, Harper & Scinto

(57) ABSTRACT

A method of producing a fiber, comprising the steps of introducing catalytic particles originally formed in a particle-forming chamber into an arraying chamber together with a carrier gas, to cause the catalytic particles to become arranged on a substrate disposed in the arraying chamber. A next step includes growing fibers, each including carbon as a major component, based on the catalytic particles arranged on the substrate. The fibers grow by heating the catalytic particles arranged on the substrate in an atmosphere containing carbon.

21 Claims, 9 Drawing Sheets

U.S. PATENT DOCUMENTS

| | | |
|---|---|---|
| 6,231,413 B1 | 5/2001 | Tsukamoto .................. 445/24 |
| 6,246,168 B1 | 6/2001 | Kishi et al. ................. 313/495 |
| 6,288,494 B1 | 9/2001 | Tsukamoto et al. ...... 315/169.1 |
| 6,331,690 B1 | 12/2001 | Yudasaka et al. ........ 219/121.6 |
| 6,413,487 B1 * | 7/2002 | Resasco et al. ........... 423/447.3 |
| 6,472,814 B1 | 10/2002 | Yamanobe et al. ......... 313/495 |
| 6,489,025 B1 | 12/2002 | Morita et al. ............... 428/367 |
| 6,624,589 B1 | 9/2003 | Kitamura et al. ........ 315/169.3 |
| 6,626,719 B1 | 9/2003 | Ono et al. .................... 445/24 |
| 6,660,680 B1 | 12/2003 | Hampden-Smith et al. . 502/180 |
| 2001/0006232 A1 | 7/2001 | Choi et al. .................... 257/10 |
| 2002/0009637 A1 | 1/2002 | Murakami et al. .......... 429/213 |
| 2002/0031972 A1 | 3/2002 | Kitamura et al. ............. 445/3 |
| 2002/0047513 A1 | 4/2002 | Nomura ....................... 313/495 |
| 2002/0057045 A1 | 5/2002 | Tsukamoto .................. 313/309 |
| 2002/0060516 A1 | 5/2002 | Kawate et al. .............. 313/495 |
| 2003/0006684 A1 | 1/2003 | Kawate et al. .............. 313/311 |
| 2003/0035769 A1 * | 2/2003 | Moy et al. ................ 423/447.2 |
| 2003/0048055 A1 | 3/2003 | Ishikura et al. ............. 313/311 |
| 2003/0057860 A1 | 3/2003 | Tsukamoto ............. 315/169.3 |
| 2005/0200261 A1 * | 9/2005 | Mao et al. ................... 313/311 |
| 2006/0049741 A1 * | 3/2006 | Bouchard et al. ........... 313/495 |

FOREIGN PATENT DOCUMENTS

| | | |
|---|---|---|
| EP | 0 290 026 B1 | 2/1993 |
| EP | 0 535 953 A2 | 4/1993 |
| EP | 0 535 953 B1 | 1/1996 |
| EP | 1 059 266 A2 | 12/2000 |
| EP | 1 113 478 A1 | 7/2001 |
| EP | 1 122 344 A2 | 8/2001 |
| EP | 1 187 161 A2 | 3/2002 |
| EP | 1 187 161 A3 | 4/2003 |
| JP | 60027700 * | 2/1985 ............. 423/447.3 |
| JP | 60-252720 | 12/1985 |
| JP | 60-252721 | 12/1985 |
| JP | 1-309242 | 12/1989 |
| JP | 2715312 | 12/1989 |
| JP | 02-167898 | 6/1990 |
| JP | 04-245922 | 9/1992 |
| JP | 08-100328 | 4/1996 |
| JP | 8-100328 | 4/1996 |
| JP | 8-115652 | 5/1996 |
| JP | 10-203810 | 8/1998 |
| JP | 11-11917 | 1/1999 |
| JP | 2000-057934 | 2/2000 |
| JP | 2000-57934 | 2/2000 |
| JP | 2001-43792 | 2/2001 |
| JP | 2001-062299 | 3/2001 |
| JP | 2001-62299 | 3/2001 |
| WO | 99/65821 A1 | 12/1999 |
| WO | 01 93292 A1 | 12/2001 |

OTHER PUBLICATIONS

F. Rohmund et al., Iron Particle Catalysed CVD Growth of Carbon Nantubes, Proceedings of Nobel Symposium 117th, The Physics and Chemistry of Clusters; Visby, Sweden, pp. 303-306 (2000).

* cited by examiner

FIG. 4A    FIG. 4B    FIG. 4C
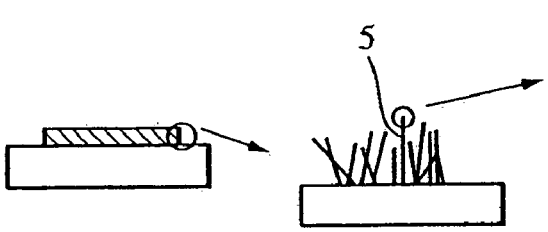
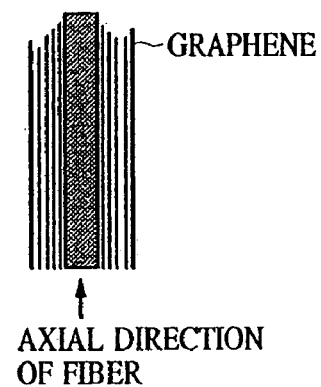
FIG. 5A    FIG. 5B    FIG. 5C
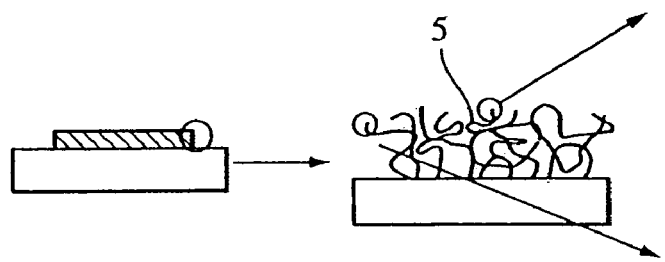
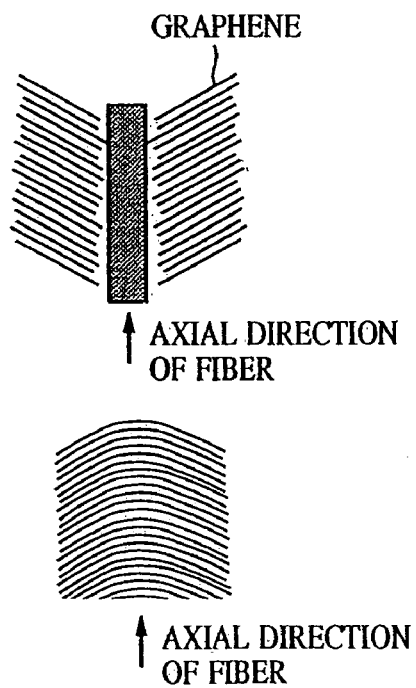

END FACE

METHOD OF PRODUCING FIBER, AND METHODS OF PRODUCING ELECTRON-EMITTING DEVICE, ELECTRON SOURCE, AND IMAGE DISPLAY DEVICE EACH USING THE FIBER

This application is a division of U.S. application Ser. No. 10/234,368, filed Sep. 5, 2002.

BACKGROUND OF THE INVENTION

1. Field of the Invention

The present invention relates to a method of producing a fiber containing carbon as a major component, a method of producing an electron-emitting device using the fiber, a method of producing an electron source having a plurality of the electron emitting devices arranged in an array configuration, and a method of producing an image display device comprising the electron source.

2. Description of the Related Art

One type of cold cathode device which has been given attention is the field-emission type (FE type) of electron emitting device which emits electrons from the surface of a material utilizing the known tunnel effect. As an example of the FE type cold cathode, at least one having a cone or quardrangular pyramid shape such as the FE cold cathode disclosed in the publication entitled "Physical properties of thin-film field emission cathodes with molybdenum cones", J. Appl. Phys., 47, 5248 (1976), by Spindt, or the like, has been known (hereinafter, referred to as the Spindt type).

In recent years, much attention also has been given to FE type cold cathodes using carbon nanotubes as emitter materials thereof. With regard to methods of producing electron emission devices using carbon nanotubes, a method of placing previously-produced carbon nanotubes into a paste material or the like, and arranging them into predetermined positions in array configuration is known (see Japanese Patent Laid-Open No. 2001-043792; hereinafter, this method is referred to as an indirect arraying method), as is a method of arranging a metallic catalyst in desired positions in an array on a substrate, and selectively growing carbon nanofibers in areas having the metallic catalyst arrayed therein by a chemical vapor deposition method (see Japanese Patent Laid-Open No. 2000-057934; hereinafter, this method is referred to as a direct arraying method).

SUMMARY OF THE INVENTION

In order to produce an image display device using an FE type cold cathode, it is required to achieve a high luminance comparable to that obtained by a CRT device. Moreover, to reduce the amount of consumed power, it is required to reduce the drive voltage and increase the quantity of electrons emitted from the cold cathode. Furthermore, it is necessary for the current quantity distribution per one pixel to be small, and also for electron-emissions from the cathode and light-emissions from a fluorescent member to be carried out stably for a long time.

To keep the luminance of the above-described type image display device at a high level for a long time, considering the service lives of the fluorescent member and cold cathode, it is necessary to increase the number of emitters per unit area and reduce emission-currents generated from the respective emitters. Moreover, to reduce the drive voltage, it is required to provide an acute-angular structure such as one like the top of the Spindt type cold cathode (referred to above), which is feasible for field-concentration.

The carbon nanotubes have a high aspect ratio, so that the electric field concentration is easily achieved, and the electron-emission can be carried out at a low voltage. Moreover, the shapes of the respective carbon nanotubes are fine, so that the carbon nanotubes can be arranged in an array and integrated so as to have a high density per unit area. Moreover, the carbon nanotubes are advantageous in that they can be inexpensively produced in a large area by a vapor deposition method or the like. Thus, carbon nanotubes are attractive and very suitable materials for cold cathodes of image display devices and the like.

However, according to conventional methods of producing carbon nanotubes, it often is difficult to arrange the carbon nanotubes in an array regularly and consistently at appropriate intervals, and to control the density of the carbon nanotubes. Moreover, since the carbon nanotubes formed by the conventional methods are arranged less regularly and consistently, in at least some cases it can be difficult to uniformly apply an electric field to the respective carbon nanotubes. Therefore, the electron emission characteristics of the devices can become irregular and inconsistent. In at least some cases, the density of electron-emission points can be low, even if the integration density of the carbon nanotubes is high.

To successfully use carbon nanotubes in an image display device, it is required to control the integration density of the carbon nanotubes and form a configuration such that an electric field can be uniformly applied to the carbon nanotubes, and moreover, to increase the number of electron emission points (electron emission sites) for increasing the current density per one pixel, while the quantity of electrons emitted from the respective tubes is reduced.

The present invention has been conceived to solve the above-described problems, and it is an object of this invention to provide a method of producing a fiber by which the fiber can be simply and easily formed and in which fibrous carbon substances such as carbon nanotubes and graphite nanofibers (which will be described below) are arranged in an array regularly at appropriate intervals and, in which the number of emission points (emission sites) per unit area is increased, the current density is enhanced, and the service life becomes long. It also is an object of this invention to provide methods of producing an electron emission device, an electron source, and an image display device, each using the fiber.

The method of producing a fiber in accordance with the present invention comprises employing a gas deposition method by which particles formed in a particle-forming chamber are introduced together with a carrier gas into an arraying chamber through a transport tube, and the particles are then arranged on a substrate disposed on a stage in the arraying chamber, through a nozzle. The method also comprises the steps of arranging catalytic particles on the substrate, and growing fibers, each containing carbon as a major component obtained from a gaseous phase, using the catalytic particles as nuclei.

The material of the catalytic particles preferably may be selected from the group consisting of Pd, Pt, Ni, Co, Fe, Cr, and mixtures of at least two of these materials, and moreover, may contain Pd or Pt as a major component. The fiber containing carbon as a major component preferably may be a fiber selected from the group consisting of a graphite nanofiber, a carbon nanotube, an amorphous carbon fiber, and a mixture of at least two of these materials.

The fibers including carbon as a major component preferably have a relationship defined by the expression $W \geq \frac{1}{2}H$, and more preferably, $W \geq 2H$, in which W represents the average distance between the portions bonded to the substrate of neighboring fibers, and H represents the average thickness of the fibers.

Moreover, the method of producing a fiber containing carbon as a major component in accordance with the present invention comprises the steps of (A) preparing a catalytic material in a first chamber, (B) arranging a substrate in a second chamber, and (C) setting the pressure in the first chamber to be higher than that in the second chamber. As a result, the catalytic material prepared in the first chamber is passed through the transport tube connecting the first chamber and the second chamber to each other and is caused to collide with the substrate so that the catalytic material (catalytic particles) is arranged on the substrate. A next step (D) includes heating the catalytic material (catalytic particles) arranged on the substrate while the catalytic material (particle) is in contact with a gas containing a carbon compound, and thereby a fiber including carbon as a major component is formed on the substrate.

Preferably, the transport tube is connected to a nozzle disposed in the second chamber. Also, preferably, the inside of the second chamber is maintained in a reduced pressure state. The catalytic material preferably may be selected from the group consisting of Pd, Pt, Ni, Co, Fe, Cr, and mixtures of at least two of these materials. The fiber containing carbon as a major component preferably may be selected from a graphite nanofiber, a carbon nanotube, an amorphous carbon fiber, and mixtures of at least two of these materials. Preferably, the fiber containing carbon as a major component has a plurality of graphenes. Also, preferably, a plurality of the graphenes are laminated in a non-parallel relationship with the axis of the fiber.

Preferably, the catalytic material collides with the substrate in its particulate state. Also, preferably, the catalytic material is transported together with the gas introduced into the first chamber into the second chamber. The gas introduced in the first chamber preferably is a non-oxidizing gas.

According to an aspect of the present invention, the catalytic particles can be controlled so as to have a desired density. As a result, fibrous carbon substances (fibers containing carbon as a major component) can be gaseous-phase-grown, and the density of the formed fibrous carbon substances can be controlled.

A method of producing an electron-emitting device in accordance with an embodiment of the present invention comprises the steps of forming a cathode electrode on a substrate, and forming a plurality of fibers each comprising carbon as a major component on the cathode electrode. The fibers each contain carbon as a major component, and are produced according to any one of the above-described methods of this invention.

Also in accordance with an embodiment of the present invention, an electron-emitting device is provided which comprises a cathode electrode disposed on a substrate, and a plurality of fibers including carbon as a major component electrically connected to the cathode electrode. A plurality of the fibers have a relationship defined by the expression $W \geq \frac{1}{2}H$, in which W represents the average distance between the portions bonded to the substrate of neighboring fibers containing carbon as a major component, and H represents the average thickness of the fibers comprising carbon as a major component.

According to another aspect of the present invention, a method of producing an electron source is provided, in which a plurality of electron-emission devices using fibers, each including carbon as a major component are formed and arranged in an array configuration. The electron-emission devices preferably are produced according to the above-described method of producing an electron-emitting device.

According to still another aspect of the present invention, a method of producing an image display device also is provided, wherein the image display device includes an electron source and a light-emitting member. The electron source preferably is produced according to the above-described method of producing an electron source.

Further objects, features and advantages of the present invention will become apparent from the following description of the preferred embodiments with reference to the attached drawings.

BRIEF DESCRIPTION OF THE DRAWINGS

FIG. 3A is a schematic plan view of catalytic particles formed on a substrate, and FIG. 3B is a schematic cross-sectional view of fibrous carbon substances grown using the catalyst shown in FIG. 3A as a nucleus.

FIGS. 4A, 4B, and 4C schematically show the structure of a carbon nanotube.

FIGS. 5A, 5B, and 5C schematically show the structure of a graphite nanofiber.

DESCRIPTION OF THE PREFERRED EMBODIMENTS

Figure 1A:
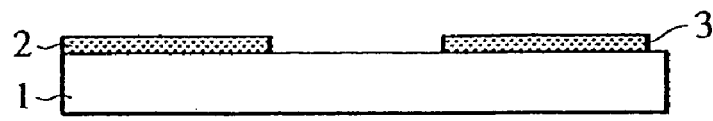
FIGS. 1A, 1B, 1C, 1D, and 1E illustrate a basic method of producing an electron emission device of Examples 1 and 2 to which the present invention is applied.

First, a gas deposition method which is a basis of a method of producing a fiber according to the present invention will be described. The gas deposition method is carried out by using an ultra-fine particle forming chamber (first chamber), a film-forming chamber (second chamber), a transport tube, and so forth. In the ultra-fine particle forming chamber, for example, a material is heated in an inert gas environment by arc heating, resistance heating, high frequency induction heating, laser heating, and the like to be melted and evaporated. Thus, the evaporated material collides with the inert gas, so that metallic ultra-fine particles (particles of a catalyst) are prepared. The preparation of such catalytic particles is not limited to the above-described method. That is, according to another embodiment of this invention, catalytic particles which already has been prepared may be supplied into the ultra-fine particle forming chamber, and dispersed in the gas present in the ultra-fine particle forming chamber (they are put into a so-called aerosol state). Then, the ultra-fine particles are introduced to the film-forming chamber via the transport tube to be ejected at a high speed through a nozzle connected to the end of the transport tube, the high-speed ejection being caused by the difference between the pressures in the ultra-fine particle forming chamber and the film-forming chamber. Thus, a dry film-forming method is carried out, and thereby, the film is directly formed. From the standpoint of the stability of film-formation, the above-described method in which the catalytic material is evaporated in the ultra-fine particle forming chamber to collide with the gas, to thereby form the ultra-fine particles is preferred. Therefore, hereinafter, a case employing the method in which the catalytic material is evaporated in the first chamber (as described above) to form the catalytic particles, will be described in detail. However, as mentioned above, the present invention may be applied to the method in which the catalytic particles are pre-formed to be used as the catalytic particles in the first chamber, and are introduced into the first chamber to be brought into the state in which the particles are dispersed in the gas (into a so-called aerosol-state).

On the other hand, to directly arrange the fibrous carbon substances (fibers each containing carbon as a major component) in an array configuration on a substrate according to a vapor deposition method, the method according to an embodiment of this invention is generally employed in which the catalytic particles as nuclei for growth of the fibrous carbon substances are arranged in an array configuration according to the production method of the present invention, and thereafter are heated in an ambient atmosphere of a gas containing carbon and so forth, and thereby, the fibrous carbon substances are grown on a region on the substrate in which the catalyst is formed.

According to a conventional method of arranging the catalytic particles in an array configuration, first a catalytic material is vapor-deposited onto a substrate by sputtering or the like, and thereafter is heat-treated so that the catalytic material becomes granular. According to this conventional method, the particles can be formed at a high density. However, when the carbon fibers are grown using the particles as the nuclei, the above-described problems are caused.

In this invention, the density of the particles for use as the catalyst is controlled according to a method to be described below, so that the array of the carbon fibers at a desired density can be provided.

Figure 2:
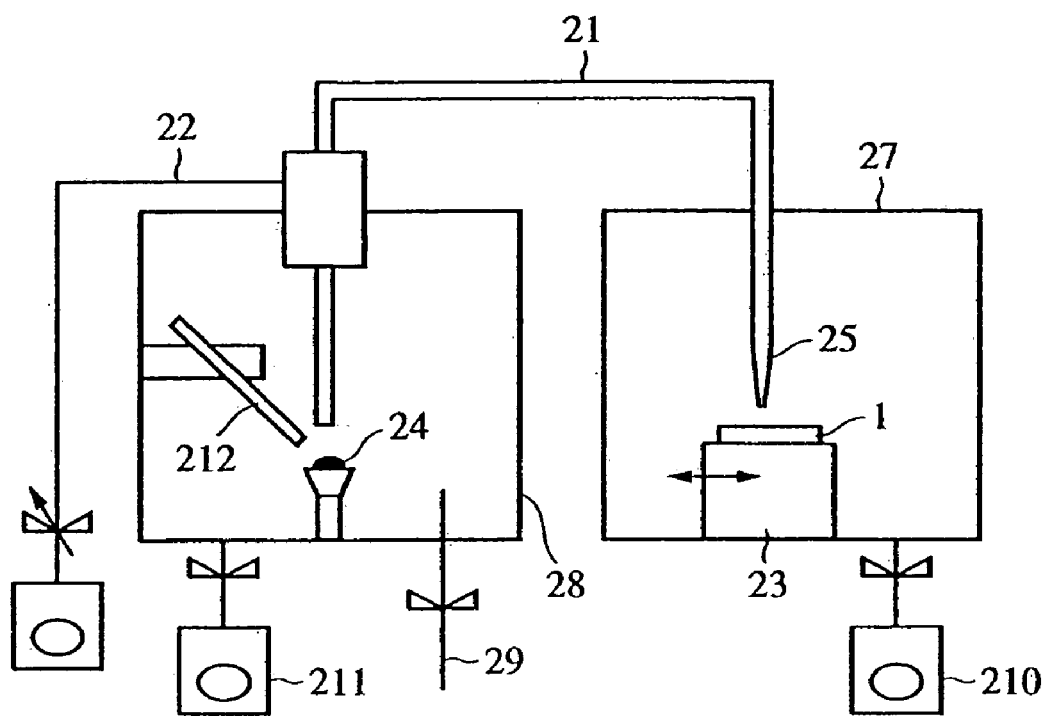
FIG. 2 is a schematic view showing a gas deposition method according to an embodiment of the present invention.

FIG. 2 is a schematic view showing an apparatus for producing a fiber according to an embodiment of the present invention. This production apparatus is provided with a particle forming chamber (first chamber) 28 in which catalytic particles are formed, a particle-arraying chamber (second chamber) 27, a transport tube 21 connecting both of the chambers, and evacuating devices 210 and 211. Thus, in FIG. 2, the substrate 1, the transport tube 21, an excess-particle exhausting mechanism 22, a substrate stage 23, a catalytic material 24, a nozzle 25, the particle-arraying chamber (the second chamber) 27, the particle-forming chamber (the first chamber) 28, a gas-introducing device 29, an arraying-chamber exhausting device 210, a forming-chamber exhausting device 211, and a material-heating device 212 are shown.

An example of the process of arraying the catalytic particles on the substrate by means of the above-described production apparatus (a first process to a third process) will be described below.

Referring to the first process, the catalytic material 24 placed in the center of the forming chamber 28 is given energy by the material heating device 212 to be evaporated. This process is provided for evaporation or sublimation of the catalytic material particles. For this process, for example, electric furnace heating, resistance heating, high frequency heating, arc-discharge carried out between opposed electrodes, or any other suitable techniques, may be used. In this process, the evaporation quantity of the catalytic material 24 is controlled. To suppress the evaporation quantity of the catalytic material 24 to a desired extent, preferably, the material is sublimated at a temperature lower than the melting point thereof.

The subsequent second process is provided for formation of the catalytic particles. In this process, the catalytic material evaporated in the first process is caused to collide with the inert gas introduced into the forming chamber 28 and is cooled, whereby the material is formed into particles. In this process, the size of the catalytic particles is determined. The size of the particles depends on the number of collision-times. Therefore, the size of the particles can be controlled by the pressure of the gas, the distance d from the evaporation portion of the catalytic material 24 to the transport tube 21, the evaporation quantity obtained in the first process, and so forth. As the gas, a non-oxidizing gas is preferably used, such as, for example, an inert gas. Specifically, helium gas is suitable, since the formed particles have a small size-distribution, although other suitable non-oxidizing gases also may be employed.

In a third process, the catalytic particles formed in the second process are arranged in an array configuration on the substrate 1. In this process, the catalytic particles are supplied to the arraying chamber 27 via the transport tube 21 by setting the pressure in the forming chamber 28 (the first chamber) so as to be higher than that in the arraying chamber 27 (the second chamber). Then, the particles drawn into the transport tube 21 are accelerated and ejected from the nozzle 25 to collide with the substrate 1 disposed on the stage 23 in the particle-arraying chamber 27 (the second chamber) and be affixed thereto. The density of the particles arranged in an array configuration on the substrate 1 can be set by controlling the difference between the pressures in the forming chamber 28 and the arraying chamber 27, the acceleration distance of the particles, the distance between the nozzle 25 and the substrate 1, the moving speed of the substrate 1, and so forth.

Preferably, the pressure in the second chamber is maintained in the reduced pressure state. The mean free path of the catalytic particles ejected under the reduced pressure state is more than about 1000 times longer than that of the catalytic particles ejected under an ordinary pressure (in the atmospheric pressure). Thus, the catalytic particles are prevented from suffering a scattering effect. That is, for example, the catalytic particles, if ejected under the atmosphere, will be scattered so that kinetic energy is lost. Thus, it is difficult to fix the catalytic particles onto the substrate 1. In many cases, the catalytic particles are not fixed to the substrate. However, the catalytic particles ejected from the nozzle 25 in the arraying chamber 27 (the second chamber) maintained in the reduced pressure state, having a high kinetic energy, can collide with the substrate 1. This kinetic energy is converted to heat energy, which makes a contribution to the affixing of the catalytic particles onto the substrate 1, which is intended by the present invention.

By controlling the conditions in processes 1 to 3, the catalytic particles 4 which are to function as nuclei for growth of the carbon fibers (the fibers containing carbon as a major component) can be arranged in an array configuration in the state thereof which is preferable for a cold cathode (electron emitting device), as shown in FIG. 1 or 3.

Figure 3A:
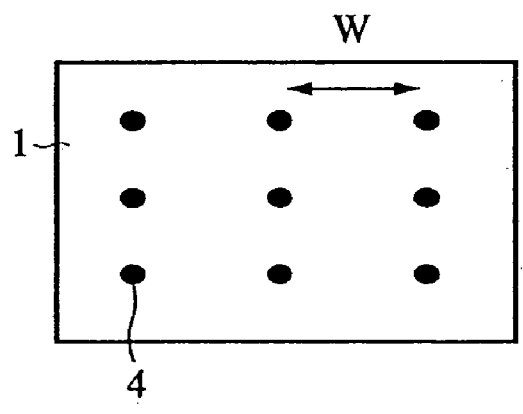
FIGS. 3A and 3B illustrate a method of producing a fiber according to the present invention.
Figure 3B:
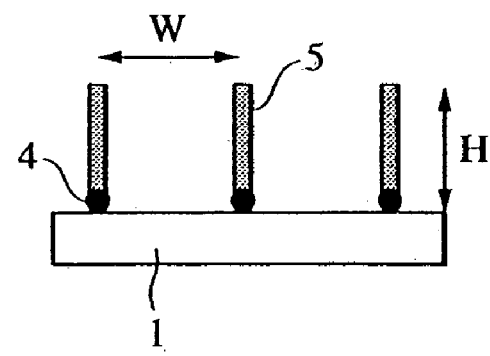

Hereinafter, an array of the fibrous carbon substances desirable for the cold cathode (electron emitting device) which can be realized by the present invention will be described with reference to FIGS. 3A and 3B. FIG. 3A is a schematic plan view showing the catalytic particles 4 deposited on the substrate 1. FIG. 3B is a schematic cross-sectional view showing the fibrous carbon substances (carbon fibers) grown using as the nuclei the deposited catalytic particles 4 shown in FIG. 3A. If the distance W between neighboring fibrous carbon substances 5 (or between the neighboring deposited catalytic particles 4) is too short, the effect of enhancing an electric field cannot be satisfactorily obtained, due to the macro-shapes of the respective fibrous carbon substances. Therefore, to effectively cause the concentration of the electric field, preferably, the distance W is set so as to be wide to some degree. Giving priority to the concentration of the electric field, preferably, the distance W is at least two times the height H of the fibrous carbon substances. In practice, the distance W may be determined based on the durability of the fibrous carbon substances, the integration degree of the electron emission points, and so forth.

An electric field can easily be applied to the respective fibers due to the above-described array of the fibrous carbon substances 5. Thus, the electron emission current from the individual fibers can be increased. Accordingly, the density of the electron emission points (electron emission sites) also can be increased. Moreover, advantageously, the voltage required for the electron emission can be reduced.

Hereinafter, one of the preferred embodiments of the method of producing an electron emitting device according to the present invention will be described in detail with reference to the drawings. The scope of the present invention is not limited to the sizes, materials, shapes and sizes, the relative positions, and so forth of the components described in this embodiment, unless otherwise noted. An example of a method of producing an electron emitting device according to the present invention will be described sequentially with reference to FIG. 1.

(1) As the substrate 1, quart glass of which the surface is sufficiently rinsed, glass of which the content of impurities such as Na is reduced and which is partially substituted with K or the like, a laminate formed by laminating $SiO_2$ onto a substrate such as a soda lime glass or silicon substrate by sputtering or the like, and an insulating substrate made of alumina or ceramics preferably may be employed. A gate electrode (also referred to as a drawing electrode or a gate) 2 and a negative electrode (also referred to as a cathode electrode) 3 is arranged on the substrate 1 (FIG. 1A).

The gate electrode 2 and the cathode electrode 3 are electro-conductive, and are formed by printing, known vacuum film-forming techniques such as vapor deposition and sputtering, and photolithography. Materials for the gate electrode 2 and the cathode electrode 3 preferably are selected from, e.g., carbon, metals, metal nitrides, metal carbides, metal borides, semiconductors, and semiconductor metal compounds. The thicknesses of the above-described electrodes preferably are within the range of from several tenths of nanometers to several micron meters. Preferably, refractory materials, that is, carbon, metals, metal nitrides, and metal carbides are employed. In a case in which the thicknesses of the gate electrode 2 and the cathode 3 are small, which may cause an undesirable voltage drop, or in a case where the devices are used in a matrix array, a metal material with a low resistance preferably may be used as a wiring, if necessary.

(2) Subsequently, a resist pattern 11 for determining locations in which the fibrous carbon substances are arranged in an array configuration is formed (see FIG. 1B).

Figure 1B:
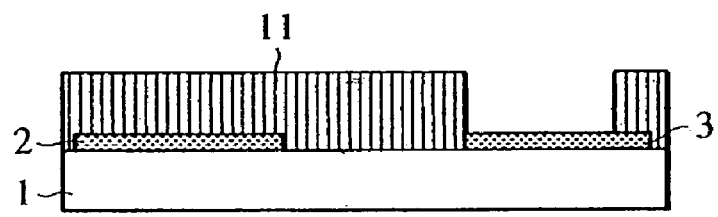
Figure 1C:
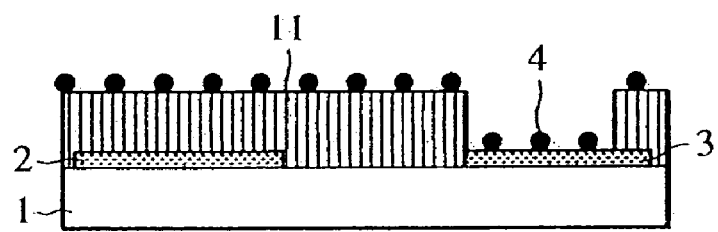

(3) Next, the catalytic particles 4 are arranged in an array configuration on the substrate 1 (see FIG. 1C). As shown in FIG. 2, the substrate 1 is placed on the stage 23 in the arraying chamber 27. The catalytic material 24 is evaporated in the forming chamber (the first chamber) 28 having a gas introduced therein. The material for the catalytic particles 4 preferably is selected from metals which function as a catalyst for growth of the fibrous carbon substances, such as Pd, Pt, Ni, Co, Fe, Cr, and their mixtures. Referring to the method of evaporating the catalytic material, one of electric furnace heating, resistance heating, high frequency heating, arc-discharge using opposed electrodes, or any other suitable technique for evaporating the catalytic material may be used. Preferably, the catalytic material 24 is sublimated at a temperature lower than the melting point thereof.

The evaporated catalytic material collides with the gas in the forming chamber 28 to be formed into particles. As the gas, a non-oxidizing gas preferably is used. Preferably, the gas is selected from rare gases such as He and Ar, $N_2$, and the like. The pressure of the gas in the forming chamber 28 preferably is selected so as to be within the range of $10^2$ Pa to $10^6$ Pa, and even more preferably within the range of $10^4$ Pa to $10^5$ Pa. A distance d between the evaporation portion of the catalytic material 24 and the transport tube 21 preferably is set so as to be within the range of several-tenths of a millimeter to several thousand millimeters, and even more preferably within the range of several millimeters to several ten millimeters.

The catalytic material formed into particles in the forming chamber 28 is drawn into the transport tube 21, and accelerated. The particles are ejected from the nozzle 25, and fixed to the substrate 1, caused by the difference between the pressures in the forming chamber 28 and the arraying chamber 27. In some cases, the catalytic particles 4 are arranged in an array configuration on a desired region on the substrate 1, caused by the movement of the substrate 1. The pressure of the arraying chamber 27 (the second chamber) preferably is set so as to be within the range of $10^{-4}$ Pa to $10^4$ Pa, and more preferably within the range of $10^2$ Pa to $10^3$ Pa. The aerosol of the catalytic particles (the gas in which the catalytic particles are dispersed) is ejected from the nozzle 25 at a flow rate of, preferably, 0.1 l/min. or higher, and more preferably, 1 l/min. or higher, toward the substrate 1. Furthermore, the catalytic particles are ejected from the nozzle 25 at a velocity of, preferably, 0.1 m/sec. or higher, more preferably, 1 m/sec. or higher, and most preferably, 10 m/sec. or higher, toward the substrate 1. The pressures in the first chamber and the second chamber are set so that the above-described flow rate and velocity can be realized. Moreover, the distance between the nozzle 25 and the substrate 1 preferably is set to be 10 cm or less, and more preferably, 1 cm or less. The shape of the nozzle 25 may be optional. Preferably, the nozzle 25 is quadrangular. Nozzles of a multi-nozzle type having a plurality of openings and a slit type are available. The size of the nozzle 25 is determined depending on the relationship between the region where the catalytic particles are to be formed and the acceleration of the gas. The area of one nozzle preferably is selected to be within the range of $10^{-6}$ cm$^2$ to 1 cm$^2$. The movement speed of the substrate 1 preferably is set to be, e.g., within the range of 0.1 mm/sec to $10^3$ mm/sec. Moreover, the distance L between the substrate 1 and the nozzle 25 preferably is set to be within the range of several tens of micronmeters to several centimeters. Preferably, the distance L is set to be 10 cm or less, and more preferably, is set to be 1 cm or less. In a case in which adhesion of the catalytic material to the substrate 1 becomes a problem, the substrate 1 is heated (several hundreds ° C.) for enhancement of the adhesion.

The density of the particles can be determined by controlling the above-described conditions. Especially, the density is affected by the evaporation amount of the catalytic material 24 in the forming chamber 28, the shape of the nozzle 25, and the movement speed of the substrate 1.

Figure 1D:
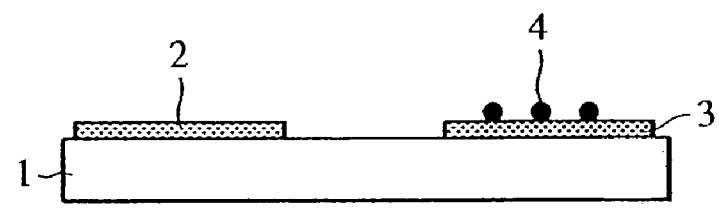

(4) Subsequently, the resist 11 is removed by means of a remover or the like, so that the unnecessary catalytic material is lifted-off (see FIG. 1D). In this embodiment, the positions in which the catalytic particles 4 are formed are determined by use of the resist pattern. However, the shape of the nozzle 25 and the movement pattern of the substrate 1 may be set so that the particles are fixed directly onto a required region, without using a mask or the like.

Figure 1E:
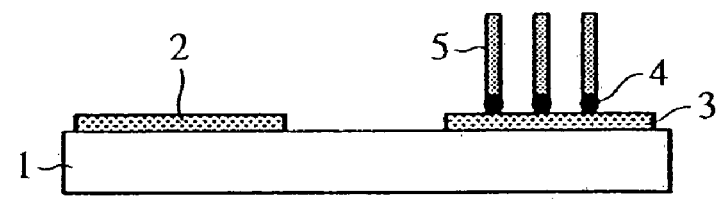

(5) Next, the fibrous carbon substances 5 are formed using the catalytic particles 4 as nuclei (see FIG. 1E). The fibrous carbon substances 5 preferably are formed utilizing a vapor deposition method (CVD method). The shape of the fibrous carbon substances may be controlled by, e.g., the type of gas used in the CVD method, a gas-decomposing means, a flow rate, crystal-growth temperature, and the shape and material of the catalytic particles 4.

In the present invention, it is preferred that fibrous carbon substances formed by decomposing an organic (hydrocarbon) gas and growing by use of a catalyst be used. As used herein, the term "fibrous carbon substance" means a columnar substance containing carbon as a major component or a linear substance containing carbon as a major component. Also, the term "fibrous carbon substance" means a fiber containing carbon as a major component. For example, the "fibrous carbon substance" may include a carbon nanotube, a graphite nanotube, an amorphous carbon fiber, and a carbon nanohorn having such a structure as is formed by closing one end of the carbon nanotube. The graphite nanofiber is most preferable as a material for a cold cathode (electron emitter).

FIGS. 4A to 4C and 5A to 5C illustrate examples of fibrous carbon substances formed by decomposition of an organic gas using a catalyst. In these drawings, FIGS. 4A and 5A on the left sides in these drawings schematically show the forms of fibrous carbon substances observed on an optically microscopic level (magnification of up to 1000). FIGS. 4B and 5B in the middle of the drawings schematically show the forms thereof as seen at a scanning electron microscopic (SEM) level (magnification of up to 30,000). FIGS. 4C and 5C on the right side schematically show the forms of the carbon substances observed at a transmission electron microscopic level (TEM) (up to 1,000,000).

The fibrous carbon substance in which the graphenes form a cylindrical shape as shown in FIG. 4C is referred to as a "carbon nanotube" (the substance in which the graphenes form a multiple-cylinder structure is referred to as a "multi-wall nanotube"). Especially, in the case of the graphene having a structure in which the tube top is opened, the threshold voltage for electron emission is lowest.

FIG. 5C shows the fibrous carbon substances which are formed at a relatively low temperature. In some cases, a fibrous carbon substance of this form is called a graphene laminate (for this reason, the laminate also is referred to as a "graphite nanotube"). More specifically, the "graphite nanotube" means a fibrous substance in which graphenes are laminated in the longitudinal direction of the fiber (the axial direction of the fiber). In other words, as shown in FIG. 5C, the "graphite nanotube" is a fibrous substance in which the graphenes are arranged in a non-parallel relationship with the axis of the fiber.

On the other hand, the "carbon nanotube" is a fibrous substance in which the graphenes are arranged substantially in parallel with the axis of the fiber.

One sheet of graphite is referred to herein as a "graphene" or a "graphene sheet". Graphite comprises a plurality of stacked or layered carbon planes. Each carbon plane preferably comprises a repeated hexagon having a carbon atom at each vertex thereof and having a covalent bond along each side thereof. The covalent bond is caused by sp2 hybrid orbitals of carbon atoms. Preferably, the distance (interval) between the neighboring carbon planes is maintained at approximately 3.354 Å. One sheet of the carbon plane is also referred to herein as a "graphene" or a "graphene sheet".

The thresholds for electron emission of both types of the fibrous carbon substances are about 1V/μm to 10V/μm, so the carbon substances are preferable characteristics for materials used as an emitter (an electron emission member) according to the present invention.

Figure 6:
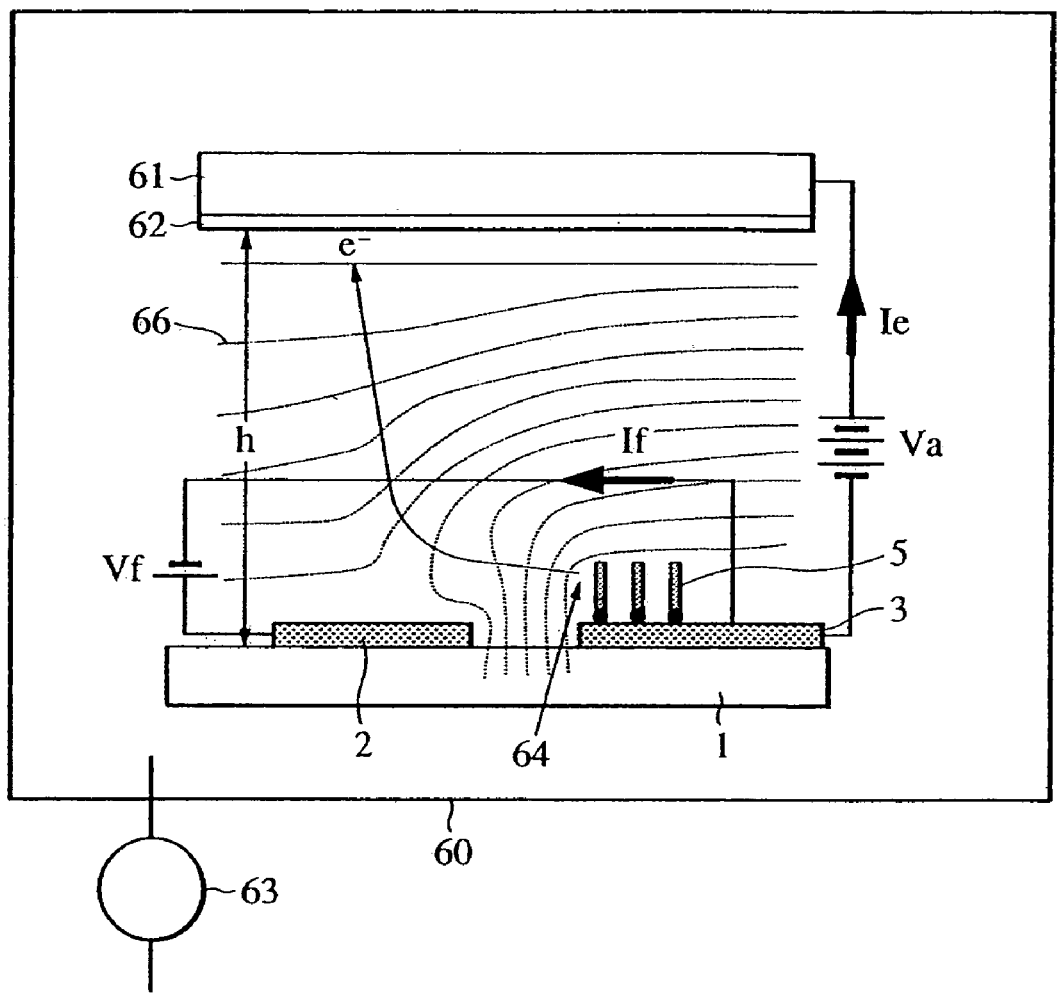
FIG. 6 shows an example of a configuration provided for operation of the electron-emission device according to the present invention.

The electron emitting device using the graphite nanofibers (which device is not limited to one having a structure such as that shown in FIG. 6), can cause electron emission by application of a low electric field, and therefore, a high emission current can be achieved. The electron emission device using the graphite nanofibers also can provide an easy manufacturing method and a stable electron emission characteristic. For example, the electron emitting device can be provided by using the graphite nanofibers as an emitter, and disposing an electrode for controlling the electron emission from the emitter. Moreover, a light-emitting apparatus can be provided by using a light-emitting member from which light is emitted in response to the member being irradiated by electrons emitted from the graphite nanofibers. Furthermore, an image display device such as a display can be formed by arranging in an array a plurality of the electron-emitting devices using the above-described graphite nanofibers, and preparing an anode electrode having a light-emitting member such as a phosphor. The electron emitting device, the light-emitting device, and the image display device each using the graphite nanofibers can stably perform electron-emission, even if an ultra-high vacuum condition is not maintained inside of each device, in contrast to a conventional electron emission device. Furthermore, the electron emission can be carried out by use of a low electric field. Thus, the devices having a high reliability can be produced easily.

The above-described fibrous carbon substance can be formed by decomposition of a gas containing carbon (preferably, a hydrocarbon gas) using a catalyst (i.e., a material for promoting the deposition of the carbon). Regarding the carbon nanotube and the graphite nanofiber, the types of catalysts and the decomposition temperatures preferably are different from each other.

Fe, Co, Pd, Ni, Pt, and their mixtures are preferably used as the catalytic material.

With Pd and Ni, the graphite nanofiber can be formed at a low temperature (400° C. or higher). The temperature at which the carbon nanotubes can be formed with Fe and Co should be 800° C. or higher. Thus, the formation of the graphite nanofiber using Pd and Ni is possible at a low temperature, and therefore is preferable in view of influences over other members (such as the substrate 1 and the electrode 3) and the manufacturing cost.

Moreover, with regard to Pd, palladium oxide can be used as a nuclei-forming material, utilizing the characteristic that the palladium oxide can be reduced at a low temperature (room temperature) by hydrogen.

For example, the above-described hydrocarbon gas may be selected from hydrocarbon gases such as ethylene, methane, propane, propylene, and acetylene, or in some cases, may be selected from vapors of organic solvents such as ethanol and acetone.

In accordance with an embodiment of this invention, the electron emitting device of this embodiment produced as described above is set in a vacuum apparatus 60 as shown in FIG. 6. The air is sufficiently evacuated from the vacuum apparatus 60 by means of a vacuum-pumping device 63 until the pressure reaches about at least $10^{-5}$ Pa. As shown in FIG. 6, an anode 61 is provided at a height h from the substrate 1, that is, preferably in a position where the anode 61 is separated by several millimeters from the substrate 1. Then, high voltage Va of several kilovolts is applied to the anode 61.

A fluorescent member (phosphor) 62 coated with an electroconductive film is disposed in contact with the anode 61. A pulse voltage, that is, a drive voltage Vf of about several tenths of volts is applied to the electron emitting device, and a flowing device-current If and an electron emission current Ie are measured.

As a result, isoelectric lines 66 are formed as shown in FIG. 6. The most concentrated region of the electric field lies at the position designated by reference numeral 64 which is nearest to the anode in the cold electrode 5 and is inside a gap between elements 2 and 3.

An image display device can be formed by arranging in an array configuration a plurality of the electron emitting devices prepared according to the present invention as shown in FIG. 6.

Hereinafter, specific examples with respect to the embodiment of the present invention will be described in detail.

EXAMPLE 1

Figure 7:
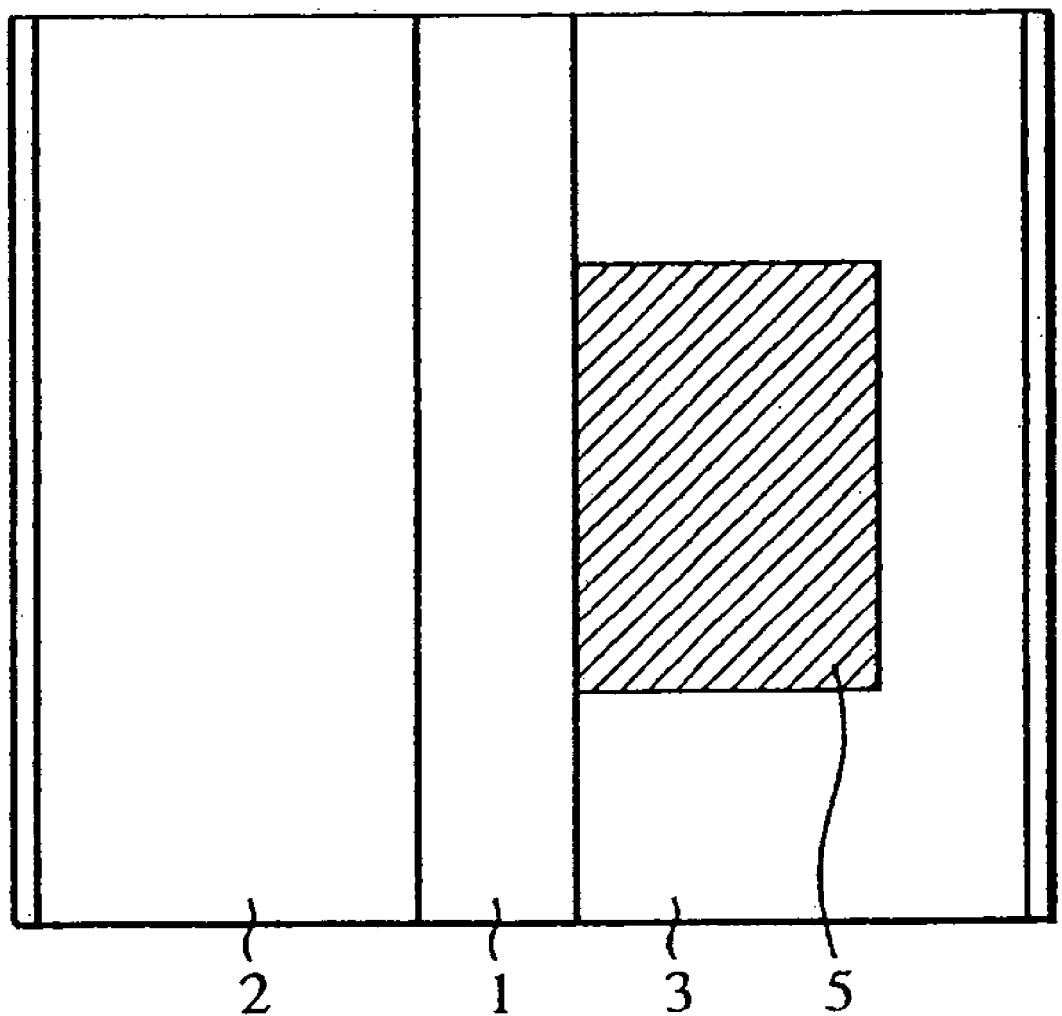
FIG. 7 is a plan view of an electron emission device produced according to the method of Example 1 of the present invention.

FIGS. 1A to 1E represent steps of a method of producing an electron emitting device in Example 1 of the present invention. FIG. 7 is a plan view showing the prepared electron emitting device. In FIG. 7, reference numeral 5 designates the region in which the fibrous carbon substances are formed. The production process for the electron-emitting device in the Example 1 will now be described below.

(Process 1)

A quartz substrate is used as the substrate 1, and sufficiently rinsed. Ti with a thickness of 5 nm, Pt with a thickness of 50 nm, and Ti with a thickness of 5 nm are vapor-deposited on the substrate in this order as a gate electrode 2 and a cathode 3 by photolithography and sputtering methods (see FIG. 1A).

(Process 2)

Next, a resist pattern 11 is formed using a negative photoresist (see FIG. 1B).

(Process 3)

Subsequently, catalytic particles 4 are arranged by a gas deposition method. As shown in FIG. 2, a substrate 1 is disposed on a stage 23 in an arraying chamber 27. Pd as the catalytic material 24 is placed on a W-boat in a forming chamber 28 having He gas introduced therein, and heated to about 1400° C. by resistance heating to be sublimated. The conditions for the formation and arranging of the particles in an array are as follows.

Pressure in forming chamber: 50000 Pa
Pressure in arranging chamber: 100 Pa
Distance d between evaporation portion and transport tube: 10 mm
Shape of employed nozzle: 0.3 mm×5 mm
Movement speed of stage: 10 cm/sec
Distance L from outlet of nozzle to substrate: 10 mm The catalytic particles 4 with a size of about 30 nm are arranged in an array at intervals of about 1 μm on the substrate 1 (see FIG. 1C).

(Process 4)

Subsequently, the resist 11 is peeled by means of a remover so that excess Pd is removed by the lift-off method. (see FIG. 1D)

(Process 5)

The heat treatment is carried out at 500° C. for 10 minutes in a gas stream (atmospheric pressure) containing 0.1% of ethylene diluted in nitrogen gas. Thus, the cold cathode 5 comprising fibrous carbon substances each containing the Pd particle as a nucleus, and having a diameter of about 20 nm to 30 nm is formed. Then, the thickness of the individual fibrous carbon substances is about 1 μm. The fibrous carbon substances are graphite nanofibers as represented in FIGS. 4B and 4C (see FIG. 1E). A plurality of the fibrous carbon substances formed in this embodiment are bending.

EXAMPLE 2

Hereinafter, Example 2 will be described, in which fibrous carbon substances having different qualities are formed in a manner similar to that in Example 1.

(Process 1)

The gate electrode 2 and the cathode 3 are formed on the quartz substrate 1, and thereafter, the resist pattern 11 is formed in a manner similar to the processes 1 and 2 in Example 1 (see FIG. 1A and FIG. 1B).

(Process 2)

The catalytic particles 4 are arranged in an array by the gas deposition method in a manner similar to the process 3 of Example 1. The conditions under which the particles are formed and arranged in an array are as follows.

Means for evaporating catalyst: resistance heating sublimation method (heating at 1400° C.)
Raw material for catalyst: mixture of Pd and Co
Pressure in forming chamber: 20000 Pa
Pressure in arraying chamber: 100 Pa
Distance d from evaporation portion to transport tube: 10 mm
Shape of employed nozzle: 0.3 mm×5 mm
Movement speed of stage: 10 cm/sec
Distance L between outlet of nozzle and substrate: 10 mm The catalytic particles 4 with a size of about 10 nm are arranged in an array on the substrate 1 at intervals of about 1 μm under the above-described conditions (see FIG. 1C).

(Process 3)

Subsequently, the resist 11 is peeled off by use of a remover, so that excess Pd and Co are removed by the lift-off method (see FIG. 1D).

(Process 4)

A substrate is placed into a tightly-closed chamber. Then, the CVD method is carried out in a gas stream ($2 \times 10^3$ Pa) containing 1% of ethylene diluted in hydrogen gas. The cold cathode 5 comprising the fibrous carbon substances each formed using the particle as a nucleus, having a diameter of about 20 nm and a high directivity are formed. In this case, the fibrous carbon substances are carbon nanotubes as shown in FIG. 5C (see FIG. 1E).

EXAMPLE 3

In Example 3, catalytic particles are arranged on a substrate by the gas deposition method, without using a mask, (as an example). FIG. 11 illustrates a method of producing an electron emission device of Example 3.

(Process 1)

Figure 11A:
FIGS. 11A, 11B, 11C, 11D, and 11E illustrate the production process for an electron emission device of Example 3 of the present invention.

Ti with a thickness of 5 nm, Pt with a thickness of 50 nm, and Ti with a thickness of 5 nm are formed on the substrate in this order by the vapor deposition method (see FIG. 11A).

(Process 2)

Figure 11B:
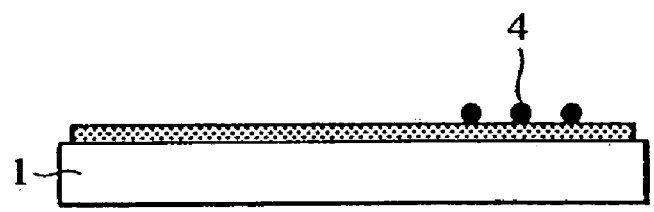

The catalytic particles 4 are arranged in an array on the substrate 1 by the gas deposition method (FIG. 11B). The conditions for formation and arranging of the particles in an array are as follows.

Means for evaporating catalyst: resistance heating sublimation method (heating at 1400° C.)
Raw material for catalyst: mixture of Pd and Co
Pressure in forming chamber: 50000 Pa
Pressure in arraying chamber: 100 Pa
Distance d from evaporation portion to transport tube: 10 mm
Shape of employed nozzle: 0.5 mm φ
Movement speed of stage: 10 cm/sec
Distance L between outlet of nozzle and substrate: 10 mm The catalytic particles 4 with a size of about 10 nm are arranged on the substrate 1 at intervals of about 1 μm under the above-described conditions (see FIG. 11B).

(Process 3)

Figure 11C:
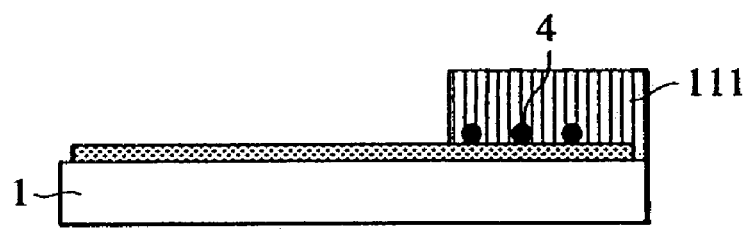
Figure 11D:
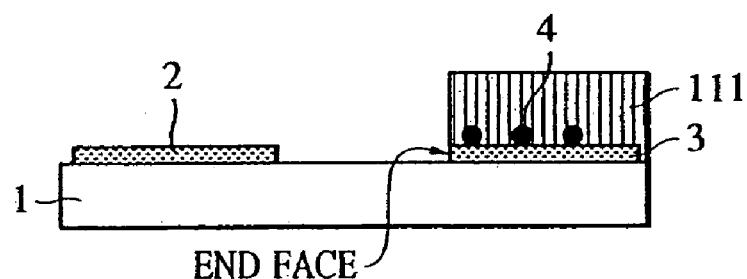
Figure 11E:
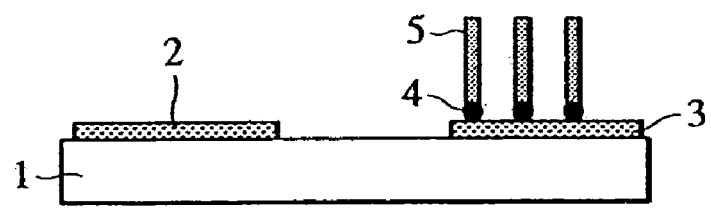

A photo-resist pattern 111 is formed in such a manner that an end face of a region where the catalytic particles 4 are arranged in an array on the substrate in the process 2 is exposed (see FIG. 11C). Next, etching of the electrode is performed so that the gate electrode 2 and the cathode 3 are divided (see FIG. 1D).

(Process 4)

The resist pattern 111 is then removed. Thus, the graphite nanofibers are formed using the catalyst as a nucleus in a manner similar to the process 5 of Example 1 (see FIG. 1E).

EXAMPLE 4

Figure 8:
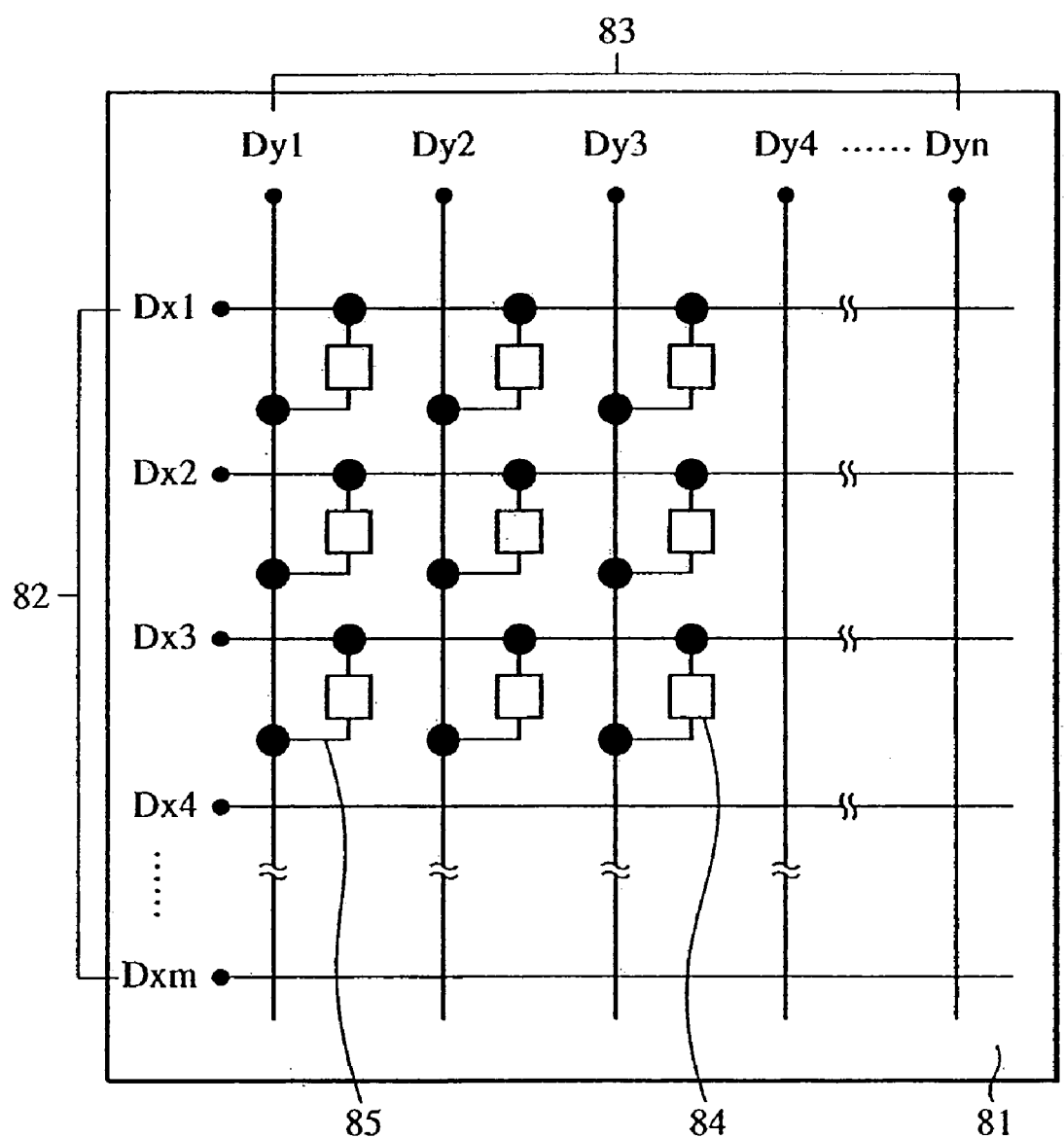
FIG. 8 is a plan view showing an example of the configuration of a simple matrix circuit using a plurality of electron sources produced by a method of the present invention.

In accordance with an Example 4 of the present invention, an image display device containing a plurality of the cold cathodes disposed therein will be described with reference to FIGS. 8, 9, and 10. In FIG. 8, an electron source substrate 81, wirings 82 in the X-direction, wirings 83 in the Y-direction, electron-emitting devices 84 constructed according to the present invention, and connecting wires 85 are shown.

Referring to the electron source substrate 81, a Ti/Pt/Ti electrode is vapor-deposited on a substrate by sputtering similarly to the method of Example 3 shown in FIG. 11. Thereafter, catalytic particles (not shown in FIGS. 8, 9, and 10) are arranged while moving the substrate (stage). The moving direction of the stage is substantially parallel to the Y-directional wires (input signal lines). The moving speed of the stage is set at about 10 cm/sec. and the shape of employed nozzle (outlet of the nozzle) is approximately 0.5 mmφ.

Subsequently, masking and etching are carried out according to photolithography, so that an end face on a (gate electrode side) of a region where the particles are arranged in an array is exposed. The resist is removed, and the graphite nanofibers are grown by a thermal CVD method.

In FIG. 8, the m X-directional wirings 82 comprise wirings Dx1, Dx2, . . . Dxm. Each wiring is formed by vapor deposition, had a thickness of about 1 μm and a width of about 300 μm, and is made of an aluminum type material. The material for the wirings, the film-thickness, and the film-width are predetermined in accordance with predetermined design criteria. The Y-directional wirings 83 comprise n wirings Dy1, Dy2, . . . Dy3 each having a thickness of 0.5 μm and a width of 100 μm. The wirings are formed in a manner similar to that for the X-directional wirings 82. Interlayer insulation layers (not shown) are provided between the m X-directional wirings 82 and the n Y-directional wirings 83 (both m and n are positive integers) to electrically isolate the wirings 82 and 83 from each other. The X-directional wirings 82 and the Y-directional wirings 83 are led-out (extend externally from the device for use) as external terminals (Dox1 to Doxm and Doy1 to Doyn).

Paired electrodes (not shown) of the electron emitting devices 84 of this Example are connected by means of the m X-directional wirings 82, the n Y-directional wirings 83, and the connecting wirings 85 made of a conductive metal or the like.

A scanning signal applying means (not shown) which applies a scanning signal to select a line of the electron-emitting devices of this Example arranged in the X-direction is connected to the X-directional wirings 82. On the other hand, a modulation signal generating means (not shown) for modulating each row of the electron-emitting devices 84 of this Example arranged in the Y-direction in correspondence with an input signal is connected to the Y-directional wirings 83. As a drive voltage to be applied to each electron-emitting device 84, the difference voltage between the scanning signal applied to the device and the modulation signal applied to the device is supplied. In this Example, Y-directional wirings are set as a high potential side and X-directional wirings are set as a low potential side.

According to the above-described configuration, the devices can be individually selected and can be independently driven by use of a simple matrix array.

An image display device using an electron source in such a simple matrix array will be described with reference to FIG. 9. FIG. 9 shows a display panel 97 of an image display device using soda lime glass as a material for a glass substrate.

Figure 9:
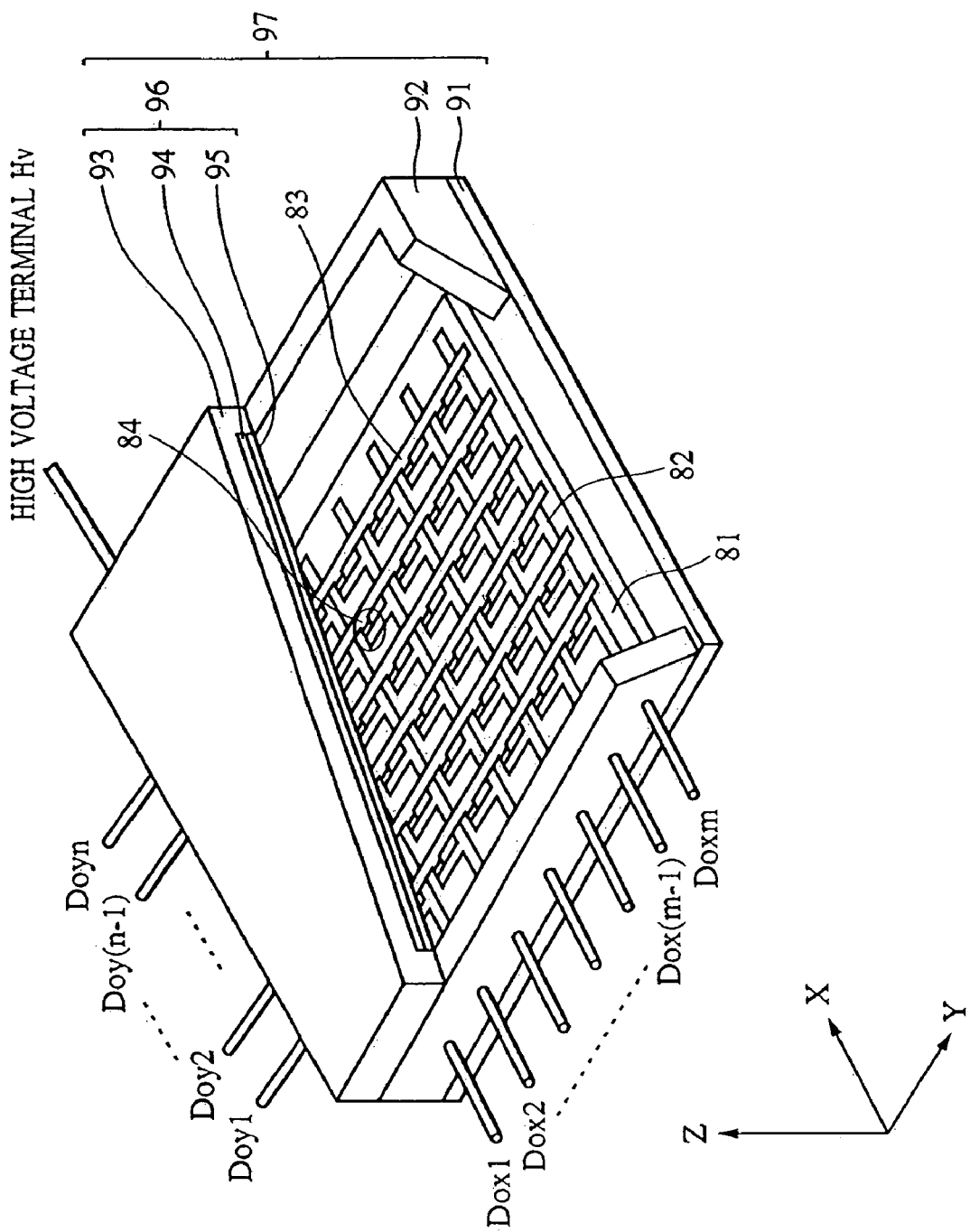
FIG. 9 is a perspective view showing an example of the configuration of an image display panel using the electron sources produced by the method of the present invention.
Figure 10:
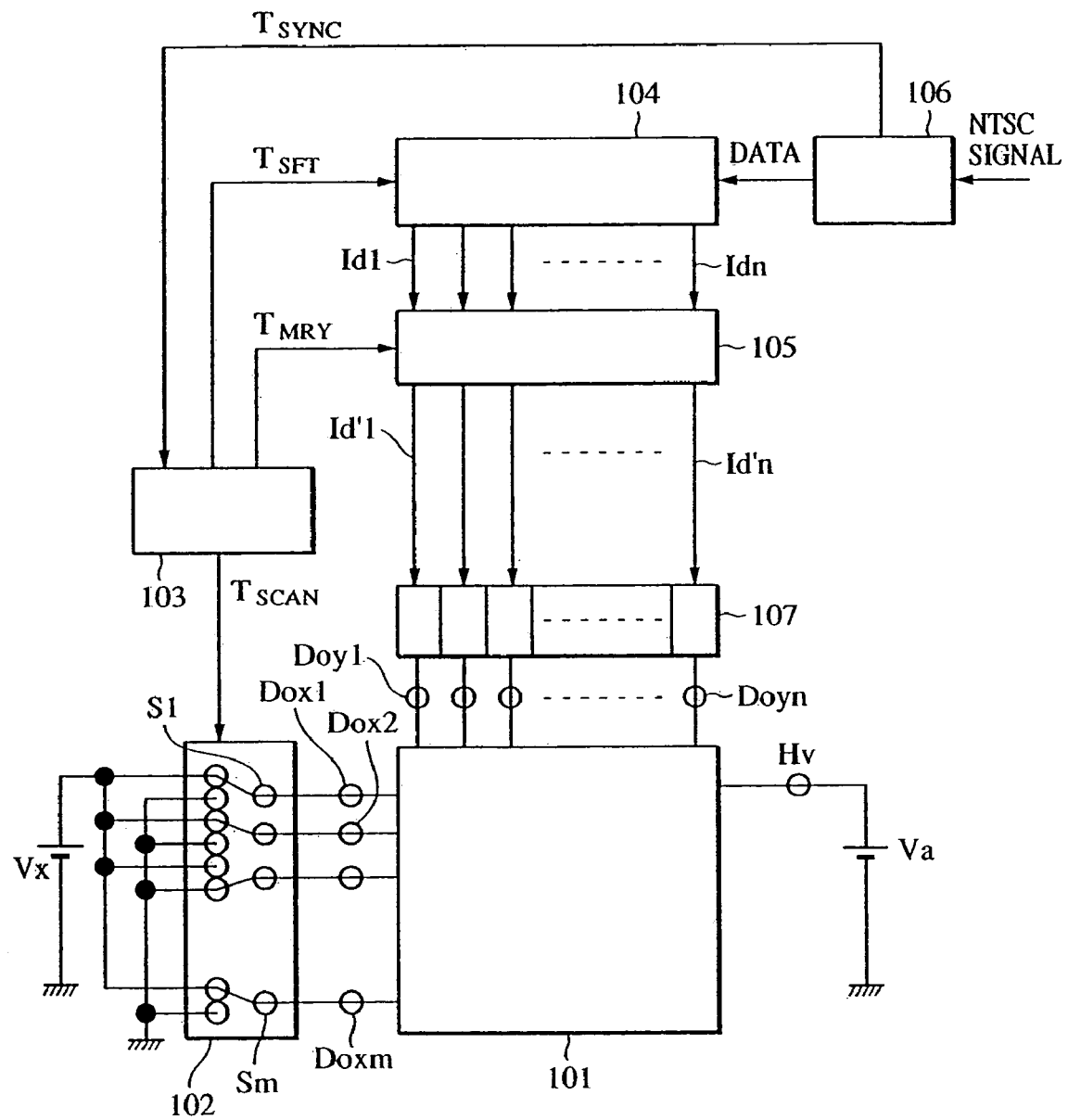
FIG. 10 shows an example of a circuit diagram of an image display panel using electron sources produced by a method of the present invention.

In FIG. 9, an electron source substrate 81 having a plurality of the electron emitting devices 84, and a rear plate 91 having the electron source substrate 81 affixed thereto are shown, as is a face plate 96 comprising a glass substrate 93, a fluorescent film 94, and a metal back 95 formed on an inner surface of the glass substrate 93. To a support frame 92, the rear plate 91 and the face plate 96 are bonded by use of frit glass or the like. Reference numeral 97 designates an envelope which is formed by baking in a temperature range of about 400° C. to 450° C. under a vacuum condition for about 10 minutes for sealing, and which comprises the components 96, 92, and 91.

The electron-emitting devices 84 correspond to electron-emitting regions in FIG. 9. Moreover, in FIG. 9, the X-directional wirings 82 and the Y-directional wirings 83 are connected to paired electrodes of the electron-emitting devices of the present invention. The envelope 97 comprises the face plate 96, the support frame 92, and the rear plate 91, as described above. Preferably, the envelope 97 further comprises a supporting member (not shown), also referred to as a spacer, disposed between the face plate 96 and the rear plate 91, and thereby has a structure having sufficient strength for withstanding atmospheric pressure.

The metal back 95 is formed by depositing Al by a vacuum deposition method or the like, on the florescent film 94, after the fluorescent film 94 is prepared and a surface on an inner side of the fluorescent film 94 is smoothing-processed (typically, referred to as filming).

Referring to the face plate 96, a transparent electrode (not shown) is formed on an outer side surface of the fluorescent film 94 to enhance the electroconductivity of the fluorescent film 94.

For the above-described sealing, in the case of a color display, respective color fluorescent members need to correspond to the electron-emitting devices. Thus, sufficient and accurate positioning of the components is necessary.

In this Example, electrons are emitted from the cathode electrode towards the gate electrode. Thus, the corresponding fluorescent member is disposed in the position 200 μm shifted from right above the electron-emitting device, when the anode voltage was 8 kV and the distance between the anodes was 2 mm.

A scanning circuit 102 will now be described. As shown in FIG. 10, the scanning circuit 102 is provided with M switching elements inside thereof (the elements are represented by S1 to Sm in FIG. 10). Each switching element selects either an output voltage from DC voltage source Vx or O(V)(ground level), and is connected to terminals Dox1 to Doxm of a display panel 101. The respective switching elements S1 to Sm are operated based on a control signal Tscan output from control circuit 103, and can be formed by combining switching elements such as FETs.

The DC voltage source Vx is set in such a manner that it outputs a constant voltage at which a drive voltage to be applied to electron-emitting devices not scanned becomes lower than the threshold voltage required for electron emission, based on the threshold voltage characteristic of the electron-emission devices of the present invention.

The control circuit 103 has a function of matching operations of the respective units 104, 105, and 102, so that appropriate display is achieved based on an image signal input from the outside. The control circuit 103 generates control signals Tscan, Tsft, and Tmry for the respective units 102, 104, and 105, based on a signal from a synchronous signal separation circuit 106.

The synchronous signal separation circuit 106 is provided for separation of a synchronous signal component and a luminance signal component from a television signal (by, e.g., the NTSC system) input from the outside, and can be formed by use of a known frequency separation (filter) circuit or the like. The synchronous signal separated (divided) by the synchronous signal separation circuit 106 comprises a vertical synchronous signal and a horizontal synchronous signal, although for convenience, the only signal Tsync representing those signals is shown in the drawing. The luminance signal component of an image separated from the above-described television signal is shown as a DATA signal, for convenience. The DATA signal is input to a shift resistor 104.

The shift resistor 104 is provided for serial/parallel conversion of the DATA signals input serially in time-series for each line of an image, and is operated based on the control signal Tsft sent from the control circuit 103 (in other words, the control signal Tsft functions as a shift clock for the shift resistor 104). The data on one line of the serial/parallel converted image (equivalent to the drive data for n electron-emission devices) is output as n parallel signals Id1 to Idn from the photoresistor 104.

A line memory 105 is a storage unit for storing the data on one line of an image for a required time, and stores the contents of the signals Id1 to Idn, if necessary, based on the control signal Tmry sent from the control circuit 103. The stored contents are output as I d'1 to I d'n, and input to a modulation signal generator 107.

The modulation signal generator 107 is a signal source for driving and modulating the electron emission devices of the present invention corresponding to the image data I d'1 to I d'n, respectively. The output signals from the modulation signal generator 107 are applied to the electron-emission devices (not shown in FIG. 10) according to the present invention in the display panel 101 via terminals Doy1 to Doyn.

The electron-emission devices which can be applied according to the present invention preferably have the following basic characteristics with respect to the emission current Ie. That is, a definite threshold voltage Vth exists, and the electron emission is caused only when a voltage higher than Vth is applied. For a voltage higher than the threshold for the electron emission, the emission current changes with the voltage applied to the electron-emission device. Thus, when a pulsed voltage is applied to the electron-emission devices of the present invention, for example, such as when a voltage lower than the threshold for the electron emission is applied, no electron emission is caused. On the other hand, when a voltage higher then the threshold for the electron emission is applied, an electron beam is output. In this case, it is possible that the intensity of the electron beam can be controlled by changing the pulse height Vm. Moreover, the total electric charge of the output electron beam can be controlled by changing the pulse width.

Referring to a system of modulating an electron emission device correspondingly to an input signal, a voltage-modulation system, a pulse-width modulation system, or another suitable modulation system may be employed. When the voltage modulation system is carried out, a voltage modulation system circuit for generating voltage pulses with a constant length, and appropriately modulating the pulse heights depending on the input data can be employed as the modulation signal generator 107.

To carry out the pulse-width modulation system, a pulse-width modulation system circuit for generating voltage pulses with a constant pulse-height, and appropriately modulating the voltage pulse-widths depending on the input data can be employed as the modulation signal generator 107. As the shift resistor 104 and the line memory 105, digital signal systems were used.

In this Example, as the modulation signal generator 107, for example, a D/A converter circuit may be used, and an amplifier circuit may be added, if necessary. In the case of the pulse-width modulation system, for example, the combination of a high speed oscillator, a counter for counting the number of waves output from the oscillator, and a comparator for comparing the output from the counter and the output from the storage device was used.

The configuration of the image display device described herein is but one example of an image display device to which the present invention can be applied. Various modifications may be carried out based on the technical idea of the present invention. With regard to the input signal, the NTSC system was referred to above. However, the input signal is not necessarily limited to this system. In addition to PAL and SECAN systems and so forth, a TV signal system of which the TV signal comprises a greater number of scanning lines than that of the above-mentioned systems (for example, high-definition television systems such as the MUSE system or the like) can be adopted.

As described above, during use of the electron-emission device produced according to the method of the present invention, an electric field can be applied easily to the respective fibers, so that electron emission can be caused from the respective fibers. Thus, the density of the electron release points in a cold cathode can be increased. Moreover, the voltage required for the electron emission can be reduced. The image display device comprises an electron source having the electron-emitting devices, and an image is formed based on an input signal. Thus, a high-quality image display device such as a color flat television set can be realized.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest reasonable interpretation so as to encompass all such modifications and equivalent structures and functions.

What is claimed is:

1. A method of producing a carbon fiber comprising the steps of:
    introducing a plurality of catalytic particles prepared in a first chamber into a second chamber through a transport tube together with carrier gas, jetted out from a nozzle, which is connected to the transport tube and disposed in the second chamber, to a substrate, which is set on a stage in the second chamber to confront the nozzle, so that a plurality of the catalytic particles becomes arranged on the substrate;
    growing a plurality of carbon fibers from a gas containing carbon, by using the plurality of the catalytic particles arranged on the substrate; and
    moving a position of the substrate while the plurality of the catalytic particles are jetted out to the substrate so that each of the plurality of the catalytic particles is arranged separately on the substrate.

2. A method of producing a carbon fiber according to claim 1, wherein a material of the catalytic particles is selected from a group consisting of Pd, Pt, Ni, Co, Fe, Cr, and mixtures of at least two of these materials.

3. A method of producing a carbon fiber according to claim 1, wherein a material of the catalytic particles includes one of Pd and Pt as a major component.

4. A method of producing a carbon fiber according to claim 1, wherein the carbon fibers are grown by heating the substrate in the gas containing carbon.

5. A method of producing a carbon fiber according to claim 1, wherein the plurality of the catalytic particles prepared in the first chamber comprise a plurality of catalytic particles dispersed in a gas introduced in the first chamber.

6. A method of producing a carbon fiber according to claim 1, wherein an inside of the second chamber is maintained in a pressure less than atmospheric pressure.

7. A method of producing a carbon fiber according to claim 1, wherein a moving rate of the substrate is set at about 0.1 mm/sec to $10^3$ mm/sec.

8. A method of producing a carbon fiber according to claim 5, wherein the gas introduced in the first chamber is a non-oxidizing gas.

9. A method of producing an electron-emitting device comprising the steps of:
    preparing a substrate having a cathode electrode on its surface; and
    forming the plurality of carbon fibers on the cathode electrode,
    wherein the carbon fibers are produced by a method according to claim 1.

10. A method of producing an electron-emitting device according to claim 9, wherein the carbon fibers are selected from a group consisting of a graphite nanofiber, a carbon nanotube, an amorphous carbon fiber, and mixtures of at least two thereof.

11. A method of producing an electron-emitting device according to claim 9, wherein each of the carbon fibers includes a plurality of graphenes, the plurality of graphenes being laminated in a non-parallel relationship relative to an axis direction of the carbon fibers.

12. A method of producing an electron-emitting device according to claim 9, wherein the carbon fibers are grown to satisfy a condition of at least $W \geq 2H$, wherein W represents an average distance between the connected portions to the cathode electrodes of each of the carbon fibers, and H represents an average thickness of the carbon fibers.

13. A method of producing an electron source, comprising the step of:
    producing a plurality of electron-emitting devices, the producing comprising the steps of:
    preparing a substrate having a cathode electrode on its surface, and
    forming a plurality of carbon fibers on the cathode electrode,
    wherein the carbon fibers are produced by a method comprising the steps of:
    introducing a plurality of catalytic particles prepared in a first chamber into a second chamber through a transport tube together with carrier gas, jetted out from a nozzle, which is connected to the transport tube and disposed in the second chamber, to the substrate, which is set on a stage in the second chamber to confront the nozzle, so that a plurality of the catalytic particles becomes arranged on the substrate,
    growing the carbon fibers from a gas containing carbon, by using the plurality of the catalytic particles arranged on the substrate, and
    moving a position of the substrate while the plurality of the catalytic particles are jetted out to the substrate so that each of the plurality of the catalytic particles is arranged separately on the substrate.

14. A method of producing an electron source according to claim 13, wherein a material of the catalytic particles is selected from a group consisting of Pd, Pt, Ni, Co, Fe, Cr, and mixtures of at least two of these materials.

15. A method of producing an electron source according to claim 13, wherein a material of the catalytic particles includes one of Pd and Pt as a major component.

16. A method of producing an electron source according to claim 13, wherein the carbon fibers are grown by heating the substrate in the gas containing carbon.

17. A method of producing an electron source according to claim 13, wherein the plurality of the catalytic particles prepared in the first chamber comprise a plurality of catalytic particles dispersed in the gas introduced in the first chamber.

18. A method of producing an electron source according to claim 13, wherein an inside of the second chamber is maintained in a pressure less than atmospheric pressure.

19. A method of producing an electron source according to claim 13, wherein a moving rate of the substrate is set at about 0.1 mm/sec to $10^3$ mm/sec.

20. A method of producing an electron source according to claim 13, wherein the gas introduced in the first chamber is a non-oxidizing gas.

21. A method of producing an image display device comprising an electron source and a light-emitting member, wherein the electron source is produced by the method according to claim 13.

* * * * *